Aug. 3, 1965           E. J. LOPER ETAL           3,198,940
                    INERTIAL NAVIGATION SYSTEM
Filed Oct. 1, 1959                              4 Sheets-Sheet 1
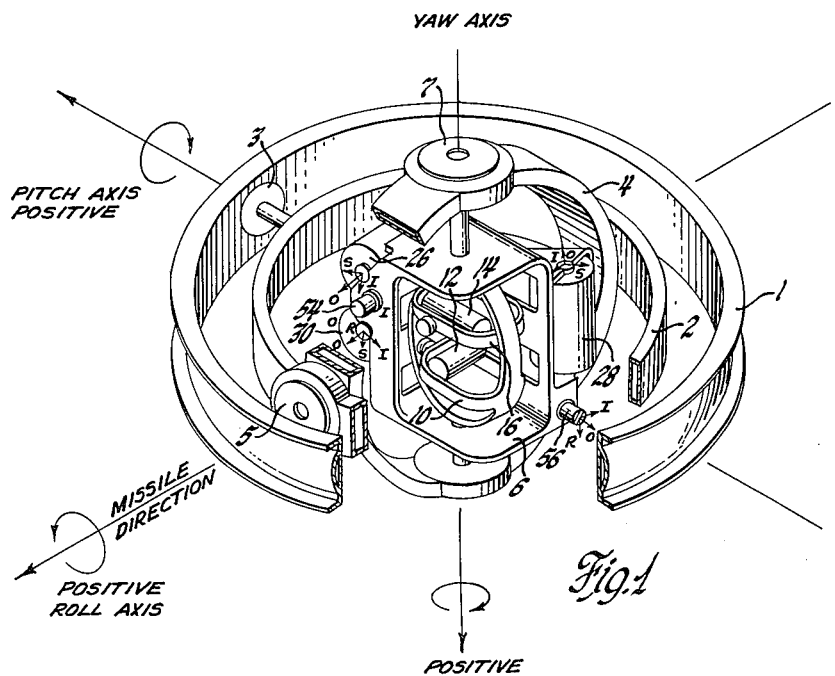
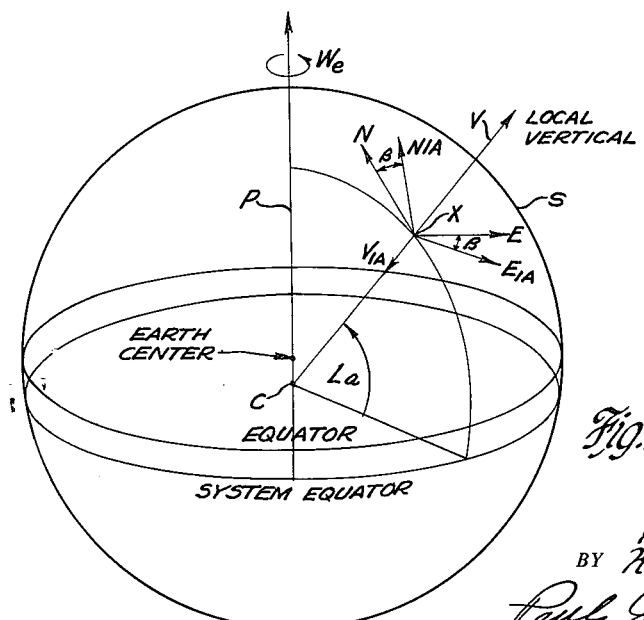
INVENTORS
Edward J. Loper, &
BY Kenneth J. Schlager
Paul J. Ethington
ATTORNEY

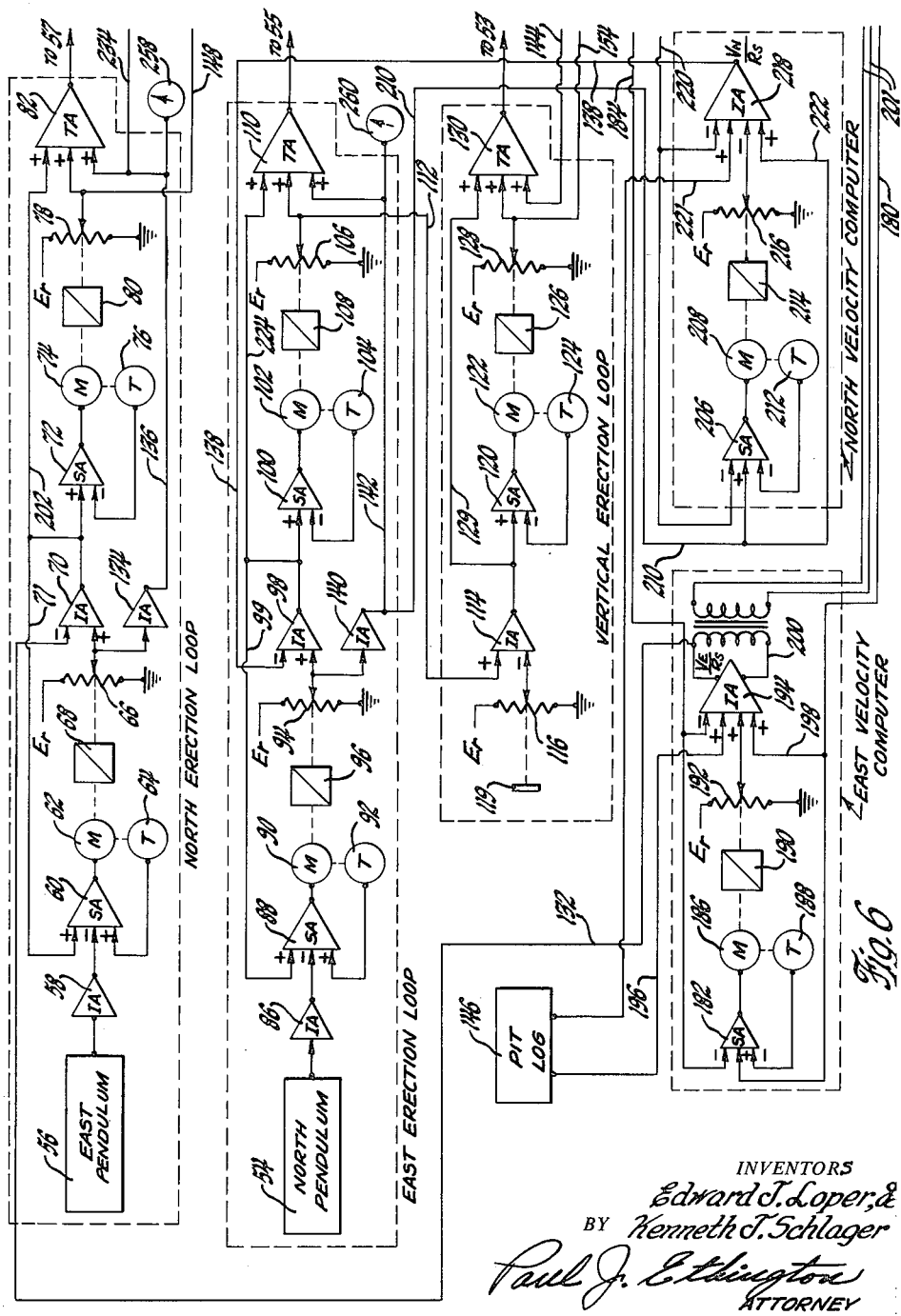

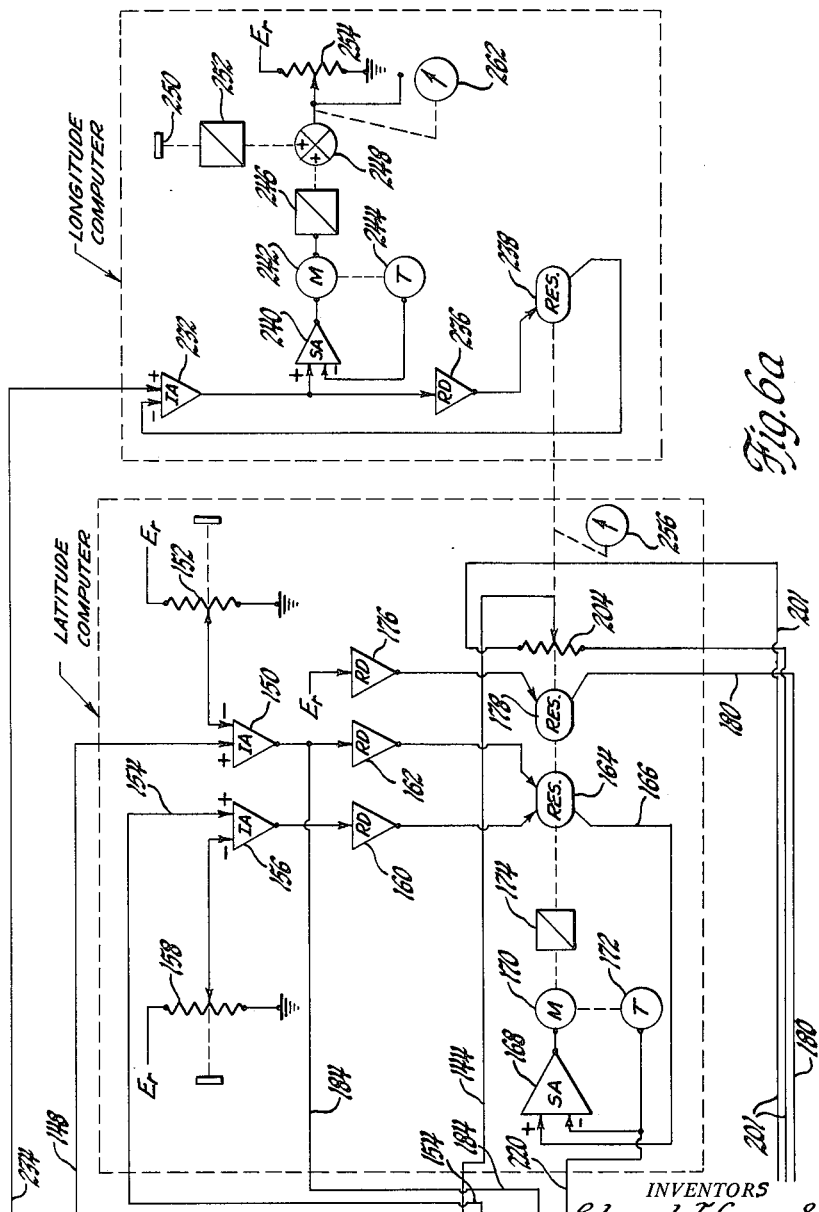

United States Patent Office 3,198,940
Patented Aug. 3, 1965

3,198,940
INERTIAL NAVIGATION SYSTEM
Edward J. Loper, Waukesha, and Kenneth J. Schlager, Wauwatosa, Wis., assignors to General Motors Corporation, Detroit, Mich., a corporation of Delaware
Filed Oct. 1, 1959, Ser. No. 844,815
9 Claims. (Cl. 235—187)

This invention relates to inertial navigation systems and more particularly to an inertial position and velocity computer.

Inertial navigation systems for vehicles are known which utilize a navigation reference coordinate system including a stable platform which is maintained in a relatively fixed orientation in celestial space or with reference to the earth. In such systems, a set of three orthogonally disposed gyroscopes mounted upon the platform sense disturbances of the platform orientation and provide signals to stabilization servomechanisms which displace the platform relative to the vehicle to maintain the fixed orientation. In systems where the platform is stabilized relative to the earth, the orientation may be accomplished by using vertical sensing pendulums on the platform to develop angular rate signals for the gyroscopes which will cause the stable platform to be aligned with the local vertical and gyrocompassing is used to align the platform in azimuth. Such systems are capable of developing vertical and azimuth information even when the vehicle is moving relative to the earth provided that vehicle initial position and velocity are known. Heretofore, the initial position and velocity information has been obtained from elaborate and complex auxiliary equipment on the vehicle in order to develop the information with the high degree of accuracy required.

In accordance with this invention, the position and velocity information is extracted from the inertial system itself. This is accomplished by determining latitude and velocity from the rates sensed by the gyroscopes mounted on the stable platform which maintains a fixed orientation with respect to the earth. In a typical system with gyroscopes oriented north, east, and vertical, velocity information is inherent in the response of the gyroscopes since velocity over the earth provides an angular rate input to the gyroscopes. This angular rate is nulled out during the erection phase to establish a departure point vertical reference memory. Latitude is also inherently present in the system because earth rate, which is a function of latitude, provides input components to both the north and vertical gyroscopes and these components are also nulled to establish the departure point vertical reference memory.

This invention provides a system capable of developing very accurate position and velocity information without any auxiliary velocity measuring device. In a preferred embodiment, however, an inaccurate velocity measuring device, such as a pit log for a marine vehicle, is employed to reduce the time required for the system to develop the desired information to a high degree of accuracy from the inherent information contained in a set of three stabilization gyroscopes aligned with the north, east, and vertical directions. The compensation rates required to constrain the gyroscopes to earth space orientation are memorized in the form of voltages and include long term angular rates due to components of earth rate and vehicle velocity. When the platform is gyrocompassed to east, there will be an azimuth error due to the original error in velocity information. Under this condition, it is found that the ratio of the long term angular rate on the vertical gyro to the long term angular rate sensed by the north gyro is equal to the tangent of latitude and this ratio provides latitude measurement that is independent of original velocity error. From the latitude information, north velocity may be computed by taking the first time derivative of latitude. The computed north angular velocity is subtracted from the measured north angular velocity and inserted in the east erection loop to correct the east gyro memory. From latitude information and the long term angular rate sensed by the north gyroscope, the error is measured east angular velocity may be determined and fed into the north erection loop to correct the north gyro memory. The error in east angular velocity when multiplied by the tangent of latitude is used to correct the vertical gyro memory. These corrections are closed loop insertions since mixing errors will result in an error signal which will correct the error in east angular velocity until equilibrium is established. The system is thus aligned north and east by accurate gyrocompassing and the correct memories are established for each of the gyroscopes and accurate velocity information is developed. Longitude may be computed by adding the time integral of east angular velocity to an initial longitude fix. Accordingly, both position and velocity information may be developed by the inventive system.

A more complete understanding of this invention may be had from the detailed description which follows taken with the accompanying drawings in which:

FIGURE 1 is a diagrammatic representation of a navigation reference system showing the relative orientation of stabilization gyroscopes, erection pendulums, and accelerometers;

FIGURES 2, 3 and 4 show the geometry of the system in relation to the earth;

Figure 3:
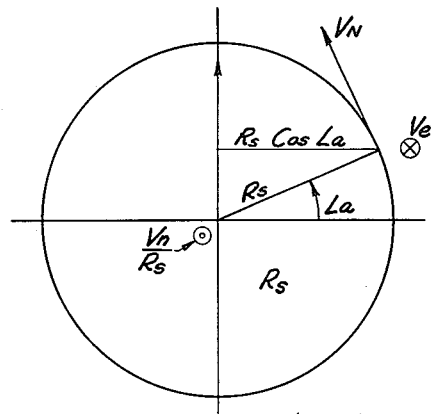
Figure 4:
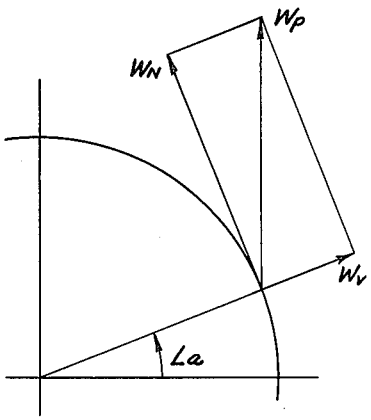

FIGURES 6 and 6a, taken together, form a diagram of the position and velocity computer in the guidance system.

The invention is of general application in inertial navigation systems for vehicles and especially adapted for marine or sea-going vehicles to develop position and velocity information. A marine inertial navigator, including the inventive position and velocity computer, may be installed on the marine vehicle as an integral part of its navigation equipment. A particular application, with respect to which an illustrative embodiment of the invention will be described, is in conjunction with aircraft or missiles adapted for launching from a marine vehicle. In this illustrative embodiment, the inertial navigation system is an integral part of the aircraft and the position and velocity computer is used for determining initial conditions prior to launch from the marine carrier vehicle. This system is oriented with reference to the earth and the reference coordinates are aligned with the launch point vertical direction, north, and east.

For the sake of clarity, the system is represented in single line schematic or block diagram since the individual components or stages are well known in the art. The signal voltages and exciting voltages, unless specified, are alternating voltages. The relative phase of the voltages is designated by the convention of plus and minus symbols in which those voltages with like symbols are of the same phase and those with unlike symbols are opposite in phase. In the mechanization of the system, which will be described presently, analog computers are used throughout. It will be appreciated that the same functions may be performed by a digital computer and the choice of computer mechanization will depend upon the particular system application.

For the purpose of establishing reference coordinates, the navigation reference system comprises a support gimbal 1 which is secured to the airframe of the aircraft. A pitch gimbal 2 is supported by trunnions in the gimbal 1 for rotation about the pitch axis of the aircraft by a pitch torque motor 3. A roll gimbal 4 is supported by trunnions in the pitch gimbal for rotation by a roll torque motor 5 about an axis perpendicular to the pitch axis. A stable platform 6 is supported by trunnions in the roll gimbal for rotation about an axis mutually perpendicular to the other gimbal axes by a yaw torque motor 7.

The purpose of the stable platform is to define the coordinate reference system for use in navigation and to support measurement components in known relation to the reference coordinate system. The measurement components are used to develop acceleration information relative to the reference coordinate system from which velocity and position information may be derived, assuming that initial position and velocity are known. For great circle navigation between the launch point and target point, there is provided a great circle heading platform 10 supported upon the stable platform 6 by a pair of trunnions for rotation about an axis parallel to the stable platform trunnions. The great circle heading platform is displaced from its reference position on the stable platform in accordance with the great circle heading from the launch point to the target. The great circle platform 10 supports a track accelerometer 12 having its sensitive input axis aligned perpendicular to the great circle heading and a range accelerometer 14 on a gimbal 16 supported for rotation about an axis perpendicular to the stable platform trunnions. The sensitive input axis of the range accelerometer 14 is aligned with the great circle heading and the gimbal 16 is displaced angularly in accordance with the present range angle to the target so that the input axis is always maintained in the local horizontal plane. This orientation of the accelerometers 12 and 14 permits the measurement of accelations of the aircraft in the horizontal plane and from the acceleration information, the velocity and position of the aircraft may be obtained by integration for use in the navigation of the aircraft.

In order to maintain the stable platform 6 in a fixed orientation defining the launch point vertical, north, and east reference coordinates, it is provided with a set of three orthogonally disposed stabilization gyroscopes 26, 28, and 30, suitably single degree of freedom integrating gyros, which develop stabilization signals for the torque motors. The vertical gyroscope 26 has its input axis I aligned with the local vertical so that any angular displacement of the aircraft about the yaw axis will provide a torque about the input axis which causes the spin reference axis S of the vertical gyroscope to rotate and produce a displacement about the output axis O. The east gyroscope 28 has its input axis pointed east and any displacement about its input axis will cause precession of the spin reference axis to produce rotation about the output axis. The north gyroscope 30 has its input axis pointed north and any displacement about its input axis will cause precession of the spin reference axis to produce rotation about the output axis.

Figure 5:
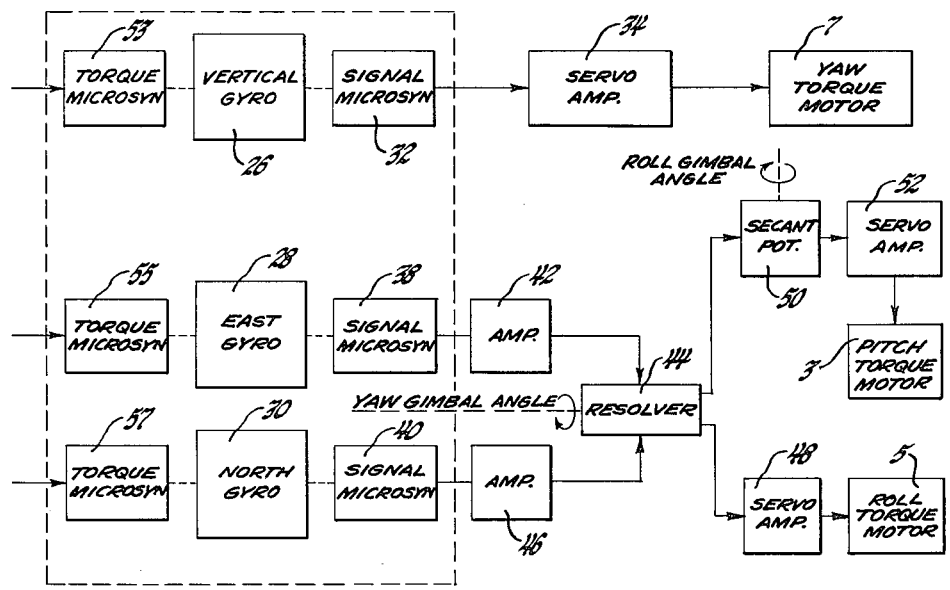
FIGURE 5 is a block diagram of the stabilization computer.

The stabilization gyroscopes are subjected to rate inputs of relatively high frequency which result from rotation of the missile about its pitch, roll, and yaw axes which may arise, for example, from the corresponding motions of the seaborne carrier vehicle or from disturbances of the aircraft in flight. In order to stabilize the platform 6 against these high frequency rates, there is provided a stabilization system as shown in FIGURE 5. The vertical gyro 26 includes a signal microsyn 32 on its output axis which develops a signal voltage, corresponding to the displacement about the gyro input axis and which is applied to the servo amplifier 34. The servo amplifier 34 controls the energization of the yaw torque motor 7 which displaces the stable platform to develop a torque about the output axis of the vertical gyroscope restoring the signal microsyn to its null position, thus maintaining the platform in its original orientation. The east gyroscope 28 includes a signal microsyn 38 on its output axis and which develops an error signal corresponding to the angular displacement of the aircraft about the east gyro input axis. Similarly, the north gyroscope 30 includes a signal microsyn 40 which develops an error voltage corresponding to the angular displacement of the aircraft about the north gyro input axis. The east and north gyroscope error signals must be resolved about the yaw gimbal angle and for this purpose, the signal microsyn 38 is coupled through an amplifier 42 to one input of a resolver 44 and the signal microsyn 40 is coupled through an amplifier 46 to the other electrical input of the resolver 44. The rotor of the resolver 44 is appropriately coupled to the yaw gimbal and one output of the resolver is applied to a servo amplifier 48 which controls the energization of the roll torque motor 5 to displace the roll gimbal 18 and develop a torque about the output axis of the east gyro 28 and the north gyro 30 until the error voltage input to the roll servo amplifier 48 is reduced to null. The other output of the resolver 44 is applied to a secant potentiometer 50 which has its movable contact displaced in accordance with the roll gimbal angle. The output of the secant potentiometer is applied to the servo amplifier 52 which controls the energization of the pitch torque motor 3. The pitch torque motor displaces the pitch gimbal to develop a torque about the output axis of the north gyroscope 30 and the east gyro 28 until the error voltage input to the pitch servo amplifier 50 is reduced to null, thus maintaining the stable platform in its original orientation.

Since the stabilization gyroscopes exhibit stability in inertial space, the stabilization system just described tends to maintain the stable platform in its original orientation in inertial space. In order to constrain the stable platform in earth space to define the coordinate reference system of launch point vertical, north, and east, additional instrumentation is necessary. This is accomplished by using gravity acceleration sensors, such as north and east erection pendulums 54 and 56, respectively, to produce torque signals for the gyroscopes which represent the correct rate compensations to drive the stable platform to local vertical and the desired azimuth orientation. To develop the compensating torques, the gyroscopes 26, 28, and 30 are provided with torque microsyns 53, 55, and 57, respectively. The north erection pendulum 54 is mounted upon the stable platform 6 with its input axis I, output axis O, and arm reference axis R aligned parallel with the north stabilization gyroscope input, output and spin reference axes, respectively. The east erection pendulum 56 is also mounted on the stable platform 6 with its input axis aligned with the input axis of the east stabilization gyroscope 28. The manner in which the signals for torque microsyns are developed from the pendulum signals will be described presently.

In the illustrative guidance system with the reference coordinates of launch point vertical, east, and north, the stable platform 6 must maintain the launch point vertical orientation throughout the flight of the aircraft. When the stable platform is constrained to maintain a fixed orientation with respect to the earth, the stabilization gyroscopes also respond to relatively low frequency angular rates arising from earth rotation or earth rate, and arising from carrier vehicle angular velocity with respect to the earth. Accordingly, compensation rates including earth rate at the launch point plus the residual and unbalance torques for the respective gyroscopes must be memorized at the launch point and supplied to the gyroscopes during flight. For the purpose of establishing this memory in respect to the relatively low frequency rates sensed by the gyroscope, there is provided an erection loop for each of the stabilization gyroscopes.

Consider now the erection of the stable platform when the carrier vehicle is not moving with respect to the earth. As shown in FIGURE 6, the north erection loop comprises the east erection pendulum 56 which develops a signal voltage corresponding to the departure of the stable platform 6 from alignment with the local gravity vector in the east-west vertical plane. This signal voltage is applied through an isolation amplifier 58 to the input of an electromechanical filter which takes the form of a servo.

The electromechanical filter includes a servo amplifier 60 which develops an error voltage for energizing the servo motor 62 in accordance with the input signal voltage, a rate feedback voltage developed by a tachometer generator 64, and a follow-up signal voltage. A potentiometer 66 is excited with a reference voltage $E_r$ and its movable contact is displaced by the servo motor 62 through a gear train 68. The potentiometer output voltage is applied to an isolation amplifier 70 having its output applied through a follow-up loop 71 to the input of the servo amplifier 60 so that the servo motor is energized to reduce the error voltage to null. The voltage developed by the potentiometer thus corresponds with the low frequency components of the pendulum signal voltage and is applied to a servo integrator. The integrator includes a servo amplifier 72 which controls the energization of the servo motor 74 in accordance with the input voltage and a rate feedback voltage developed by tachometer generator 76. A memory potentiometer 78 is excited with the reference voltage $E_r$ and has its movable contact displaced by the servo motor 74 through a gear train 80. The voltage on the memory potentiometer 78 is applied to the torque amplifier 82, together with a proportional signal on conductor 202 for damping, which energizes the torque microsyn 57 on the output axis of the north stabilization gyroscope 30. Accordingly, through the stabilization loop, previously described, the stable platform 6 is displaced until the error voltage developed by the signal microsyn 40 is reduced to zero overcoming the compensation torque developed in the north erection loop by torque microsyn 57 and in this condition, the memory potentiometer 78 develops a voltage which represents the sum of the earth rate and the unbalance and residual torques of the north stabilization gyroscope 30.

The east erection loop comprises the north erection pendulum 54 which develops a signal voltage corresponding to the departure of the stable platform from the north-south vertical plane. This signal voltage is applied through an isolation amplifier 86 to the input of an electromechanical filter or servo. The electromechanical filter includes a servo amplifier 88 which develops an error voltage for energizing a servo motor 90 in accordance with the input signal voltage, a rate feedback voltage developed by a tachometer generator 92, and a follow-up signal voltage. A potentiometer 94 is excited with the reference voltage $E_r$ and its movable contact is displaced by the servo motor through a gear train 96. The potentiometer output voltage is applied to an isolation amplifier 98 having its output applied through a follow-up loop 99 to the input of the servo amplifier 88 so that the servo motor is energized to reduce the error voltage to null. The voltage developed by the potentiometer 94 thus corresponds to the low frequency components of the pendulum signal voltage and is applied to a servo integrator. The integrator includes a servo amplifier 100 which controls the energization of the servo motor 102 in accordance with the input signal voltage and a rate feedback voltage developed by tachometer generator 104. A memory potentiometer 106 is excited with the reference voltage $E_r$ and has its movable contact displaced by the servo motor through a gear train 108. The voltage on the memory potentiometer is applied to the torque amplifier 110, together with a proportional signal on conductor 224 for damping which energizes the torque microsyn 55 on the output axis of the east stabilization gyroscope 28. Accordingly, through the stabilization loop, previously described, the stable platform 6 is displaced until the error voltage developed by the signal microsyn 38 is reduced to zero, balancing the compensation torque developed in the east stabilization loop by torque microsyn 55 and in this condition, the memory potentiometer 106 develops a voltage which represents the sum of the earth rate and the unbalance and residual torques of the east stabilization gyroscope.

The vertical erection loop is used for establishing the azimuth of the stable platform by gyroscompassing. The east stabilization gyroscope when oriented with its input axis pointed east senses no earth rate and, accordingly, with the stable platform properly oriented in azimuth, the voltage on the memory potentiometer 106 in the east erection loop will represent only the unbalance and residual torques of the east stabilization gyroscope. This memorized voltage on potentiometer 106 is applied through conductor 112 to one input of an isolation amplifier 114. The memorized value of the unbalance and residual torque of the east stabilization gyroscope is represented by the voltage developed on a memory potentiometer 116 excited with the reference voltage $E_r$ and having its movable contact displaced by the actuator 119 in accordance with the known value of these torques. The amplifier 114 subtracts the input voltages and the output voltage, which represents the earth rate sensed by the east stabilization gyroscope, is applied to the servo amplifier 120 in the vertical erection loop integrator. In this integrator, the servo amplifier 120 energizes a servo motor 122 in accordance with the input signal voltage and a rate feedback voltage developed by tachometer generator 124. The servo motor, through a gear train 126, displaces the movable contact of a memory potentiometer 128 which is excited by the reference voltage $E_r$. The memory potentiometer output voltage is applied to a torque amplifier 130, along with a proportional signal on conductor 129 for damping, which energizes the torque microsyn 53 of the vertical gyroscope 26. Accordingly, a torque is applied to the output shaft of the vertical gyroscope corresponding to the earth rate sensed by the east gyroscope and through the vertical stabilization loop the stable platform is displaced in azimuth until the earth rate sensed by the east gyroscope is reduced to zero. Thus, the potentiometer 128 memorizes the compensation voltage necessary to maintain the stable platform oriented so that the input axis of the east gyroscope points east and the input axis of the north gyroscope points north.

Consider now the conditions obtaining when the seaborne carrier vehicle is located at a particular position on the earth. In the illustrative embodiment of a carrier launched aircraft, a guidance sphere representation of the earth S is employed as indicated in FIGURE 2 although it will be appreciated that in use of the system for navigation of the marine vehicle only, such representation is not required. For the purpose of guidance computations, a spherical earth is assumed and because of the actuatol oblateness of the earth, the centers of the two bodies do not coincide. The center C of the guidance sphere is located at the point of intersection of the earth's polar axis P and the direction of local vertical V. The system equator is parallel to the earth's equator and contains the center of the guidance sphere.

With the carrier vehicle stationary relative to the earth and with the input axes of the stabilization gyroscopes aligned north, east, and vertical, the gyroscopes sense components of earth rate $W_e$ about their respective input axes which are functions of latitude $La$ and add to the fixed gyroscope residual torque R and unbalance torque U. (The subscript notations $i$, $o$, and $s$ will be used to denote gyro input, output and spin axes respectively and N, E, and V will be used to denote north, east and vertical directions respectively. For example, $U_{i-n}$ represents the unbalanced troque about the input axis of the north gyroscope.) The total rate input to the gyroscopes north, east and vertical under this condition, represented by the terms $w'_N$, $w'_E$, $w'_V$, may be expressed as follows:

$$w'_N = W_e \cos La + R_N + U_{i-N} \qquad (1)$$

$$w'_E = R_E \qquad (2)$$

$$w'_V = -W_e \sin La + R_N + U_{s-N} \qquad (3)$$

With the carrier vehicle in motion, it may be considered to be traveling in a horizontal plane only and its linear velocity will have a north velocity component $V_N$ and an east velocity component $V_E$. However, this travel is, in effect, movement over the surface of a sphere and these velocities may be treated as angular velocities. The north velocity component $V_N$ is on a lever arm equal to the radius of the guidance sphere, $R_S$, and the angular velocity is $V_N/R_S$. The east velocity component is velocity at a constant latitude and its lever arm is equal to the radius of the guidance sphere $R_S$ times the cosine of latitude of the vehicle or $V_E/R_S \cos La$. These velocities may be expressed in vector form, according to the righthand rule, to combine the vehicle velocity components with the earth rate. The total angular velocity $w_P$ parallel to the polar axis is the sum of the vehicle velocity component and the earth rate:

$$w_P = \frac{V_E}{R_S \cos La} + w_o \tag{4}$$

The total velocity $w_W$ perpendicular to the vehicle meridian in a westerly direction is $$w_W = \frac{V_N}{R_S} \tag{5}$$

With the three stabilization gyroscopes aligned with their input axes in the east, vertical, and north directions, they "see" components of long term input rates $w_E$, $w_V$, and $w_N$ respectively, from earth rate and vehicle angular velocity as follows:

$$w_E = -w_N \tag{6}$$
$$w_V = w_P \sin La \tag{7}$$
$$w_N = w_P \cos La \tag{8}$$

In order to obtain the total input rate for the stabilization gyroscopes under the specified conditions on the moving vehicle, the compensation rates are added to the earth rate and vehicle angular velocity. The total rate for the east gyro $w_E$ is obtained by combining Equations 5 and 6 and adding the rate due to residual torque $R_E$ to derive:

$$w_E = \frac{V_N}{R_S} + R_E \tag{9}$$

The total rate for the vertical gyro $w_V$ is obtained by substituting Equation 4 in Equation 7 and adding the rate due to residual torque $R_V$ and that due to unbalance torque $U_{s-v}$ to obtain:

$$w_V = -W_o \sin La - \frac{V_E}{R_S} \tan La + R_V + U_{s-v} \tag{10}$$

wherein the term $V_E/R_S \tan La$ represents the relative eastward velocity $V_E/R_S$ corrected for small circle path by $\tan La$. The first two terms on the righthand side of Equation 10 are negative because the velocity quantities are expressed in vector form and the sign of the terms depends upon the choice of positive direction for the reference coordinate axes. Similarly, the total input rate for a north gyro $w_N$ is obtained by substituting Equation 4 in Equation 8 and adding the rate due to residual torque $R_N$ and that due to unbalance $U_{i-N}$ to derive:

$$w_N = W_o \cos La + \frac{V_E}{R_S} + R_N - U_{i-N} \tag{11}$$

With the system thus far described, the memory potentiometers 78, 106, and 128 in the north, east, and vertical erection loops, respectively, will develop voltages in accordance with the following expressions:

$$K_N E_N = w_N \tag{12}$$
$$K_E E_E = w_E \tag{13}$$
$$K_V E_V = w_V \tag{14}$$

where, $K_N$, $K_E$, $K_V$ are the scale factors for the potentiometers and $E_N$, $E_E$, and $E_V$ are the potentiometer voltages. These memory potentiometers are supposed to memorize only earth rate and gyro compensation rates in order to stabilize the reference system with respect to the earth but the foregoing expressions include components due to vehicle motion with respect to the earth. To remove these components, and for other purposes, it is necessary to provide an accurate source of vehicle velocity information.

For this purpose, the system is provided with an east velocity computer and a north velocity computer which develop east angular velocity $V_E/R_S$ and north angular velocity $V_N/R_S$. Assume for the sake of explanation that the computed values of north and east velocity are perfectly accurate. Since the platform is stabilized in the horizontal plane, it is desired to prevent change of energization of the torque amplifier 82 which will cause the stabilization loops to displace the platform from its level attitude. In order to remove any component due to vehicle velocity from the memory potentiometer 78, the computed east angular velocity is applied through conductor 132 to the input of the isolation amplifier 70. Consequently, a proportional signal is applied through conductor 202 to torque amplifier 82 and a follow-up voltage is applied through loop 71 to servo amplifier 60 which causes the output voltage of potentiometer 66 to become equal to the computed east angular velocity and effectively cancel the proportional signal. This potentiometer voltage is applied to the torque amplifier 82 through amplifier 134 and conductor 136 and is effective through the stabilization loop to disturb the pendulum 56. This disturbance is translated through the filter and integrator to the memory potentiometer 78 until its memorized voltage is changed in accordance with the value of the computed east angular velocity and the net input to the torque amplifier 82 is restored to its previous value. Thus, the north erection loop maintains the stable platform 6 with the axis of the roll gimbal in the horizontal plane and the memorized voltage $E_N$ on the potentiometer 78 corresponds only to the earth rate and gyro compensation rates. In order to remove the azimuth error which is induced in the system by response of the east gyroscope to vehicle velocity, the computed north angular velocity is applied through conductor 138 to the input of the isolation amplifier 98. Consequently, a proportional signal is applied through conductor 224 to the torque amplifier 110 and a follow-up voltage is applied through loop 99 to servo amplifier 88 which causes the output voltage of potentiometer 94 to become equal to the computed north angular velocity and effectively cancel the proportional signal. This potentiometer voltage is applied to the torque amplifier 110 through the isolation amplifier 140 and conductor 142 and is effective through the stabilization loop to disturb the pendulum 54. This disturbance is translated through the filter and integrator to change the voltage of the memory potentiometer 106 and thence through conductor 112 to the vertical erection loop. This voltage change causes isolation amplifier 114 to develop an error voltage which is applied to the torque amplifier 130 through conductor 129 and which is applied through the integrator to the potentiometer 128 and thence to the torque amplifier 130. The resulting change of the input to the torque amplifier causes microsyn 53 to develop a disturbance torque which rotates the vertical gyroscope 26 and hence changes the orientation of the east gyro 55. This in turn affects the north pendulum 54 and causes a change in the output voltage of the memory potentiometer 106 which is consequently fed back to the vertical erection loop. When the system has settled out, the component of voltage on the potentiometer 106 due to vehicle velocity is removed and the azimuth error has been eliminated.

In the vertical erection loop, the component of voltage on the memory potentiometer 128 due to small circle velocity $$\frac{V_E}{R_S} \tan La$$

is removed by inserting a heading compensation voltage corresponding to this velocity. This compensation voltage is developed on conductor 144 by the latitude computer, which will be described presently, and is applied to the torque amplifier 130. The output voltage from the torque amplifier 130 is applied to the torque microsyn 53 which causes rotation of the vertical gyroscope and produces an error in azimuth. This azimuth error causes the east gyroscope to sense an earth rate component which in turn disturbs the north pendulum causing an error voltage on conductor 99 and the memory potentiometer 106. Consequently, this disturbance is inserted into the vertical erection loop and causes the voltage on memory potentiometer 128 to change in a sense that effectively cancels the compensation voltage input to the torque amplifier 130. Thus the rotation of the vertical gyro and the disturbance of the north pendulum are overcome with consequent changes in the input of the vertical erection loop. When the system has settled out, the voltage on the memory potentiometer 106 is the same as that prior to the disturbance and the voltage on memory potentiometer 128 has been corrected for the small circle velocity. Since the output of the torque amplifier 130 is the same as that prior to the disturbance, the azimuth of the stable platform is not affected by the insertion of the small circue correction.

Contrary to the above-mentioned assumption, the vehicle velocity source, which suitably takes the form of a conventional pit log 146, is subject to considerable inaccuracy. Consequently, with the angular vehicle velocities $V_N/R_S$ and $V_E/R_S$ in error by $$\frac{\Delta V_N}{R_S}$$

and $$\frac{\Delta V_E}{R_S}$$

the memorized voltages on the erection memory potentiometers 78 and 128 are in error and unknown azimuth error B does exist in the system. As a result, the input axis of the north stabilization gyroscope is displaced by the angle B from north and the input axis of the east stabilization gyroscope is displaced from east by the angle B as shown in FIGURE 2. This causes the response of the north gyroscope to earth rate and its response to vehicle angular velocity to be modified by cosine and sine functions of the unknown azimuth error. Additionally, the response of the north gyroscope includes a component corresponding to the erroneous computed east angular vehicle velocity $$\frac{V_E+\Delta V_E}{R_S}$$

These modifications appear in the quantity memorized on the north erection loop memory potentiometer 78, viz.

$$K_N E_N = W_e \cos La \cos B + R_N - U_{i-N} + \frac{V_E}{R_S} \cos B - \frac{V_N}{R_S} \sin B - \frac{V_E+\Delta V_E}{R_S} \quad (15)$$

Similarly, the inaccurate velocity information has caused an azimuth error and the equation representing the voltage of the memory potentiometer 106 has the form:

$$K_E V_E = -W_e \cos La \sin B - \frac{V_E}{R_S} \sin B - \frac{V_N}{R_S} \cos B + \frac{V_N+\Delta V_N}{R_S} \quad (16)$$

The voltage memorized by potentiometer 128 is also in error and may be expressed by:

$$K_V E_V = -W_e \sin La + R_V + U_{s-V} - \frac{V_E}{R_S} \tan La + \frac{V_E+\Delta V_E}{R_S} \tan La_i \quad (17)$$

where, $\tan La_i$ is the small circle correction for a computed latitude $La_i$. The actual long term angular rates $W_N$, $W_E$, and $W_V$, which are seen on the output axes of the stabilization gyroscopes, can be expressed from Equations 15, 16, and 17 as follows:

$$W_N = K_N E_N + U_{i-N} - R_N = W_e \cos La \cos B + \frac{V_E}{R_S} \cos B - \frac{V_N}{R_S} \sin B - \frac{V_E+\Delta V_E}{R_S} \quad (18)$$

$$W_E = K_E E_E - R_E = -W_e \cos La \sin B - \frac{V_N}{R_S} \cos B - \frac{V_E}{R_S} \sin B + \frac{V_N+\Delta V_N}{R_S} \quad (19)$$

$$W_V = K_V E_V - R_V - U_{s-V} = -W_e \sin La + \frac{V_E+\Delta V_E}{R_S} \tan La_i - \frac{V_E}{R_S} \tan La \quad (20)$$

Multiplying Equation 18 by sine $La$ and Equation 19 by cos $La$ and adding these products, and for small values of unknown azimuth error B, the summation reduces to:

$$W_N \sin La + W_V \cos La = -\frac{V_N}{R_S} \sin La \sin B + \frac{V_E+\Delta V_E}{R_S} (\tan La_i \cos La - \sin La) \quad (21)$$

In order to manipulate this expression further, define $$\tan La_i \cos La - \sin La = \sin La_i' - \sin La = \sin La(E_i) \quad (22)$$

where, $E_i$ is some function of the error in $La$. Then by substitution of Equation 22 into Equation 21, and after collecting terms and cross-multiplication, Equation 21 reduces to:

$$\tan La = \frac{-W_V}{W_N+\frac{V_N}{R_S}\sin B - \frac{V_E+\Delta V_E}{R_S}E_i} \quad (23)$$

In order to facilitate solution of Equation 23 which is derived from Equations 21 and 22, it will be assumed that the tangent of the indicated latitude is equal in magnitude to the ratio of the long term angular rate sensed by the vertical gyroscope to the long term angular rate sensed by the north gyroscope. To verify that this assumption is correct, i.e., that $$\tan La_i = \frac{-W_V}{W_N}$$

this quantity is substituted into Equation 21. After collecting terms and cross-multiplying, Equation 23 is derived which shows that the assumption was correct when the azimuth error and the error in latitude is reduced to zero. Therefore, with $\tan La_i$ assumed to be $$\tan La_i = \frac{-W_V}{W_N} \quad (24)$$

then by iteration in the system, by gyrocompassing, the indicated latitude $La_i$ will converge to the actual latitude $La$ and the function of the error $E_i$ in $La$ will converge to zero, and Equation 23 reduces to:

$$\tan La = \frac{-W_V}{W_N} \quad (25)$$

which yields the desired expression for actual latitude $$La = \tan^{-1} \frac{-W_V}{W_N} \quad (26)$$

and the relation may also be written as $$W_N \sin La = -W_V \cos La \quad (26')$$

In the system, as represented in FIGURE 6, the above-described iteration is brought about by closing the loop between the erection loops and the velocity computers through a latitude computer. In order to derive the long term angular rate $W_N$ for the north stabilization gyroscope, the output of memory potentiometer 78 which develops the voltage $E_N$ is connected through conductor 148 to the input of the isolation amplifier 150. A potentiometer 152 excited with the reference voltage is adjusted to develop an output corresponding to the north gyro compensation rates $(U_{1-n}-R_N)$ which is supplied to the input of the isolation amplifier 150. This amplifier thus develops an output corresponding to the long term rate $W_N$. Similarly, a voltage corresponding to the long term angular rate $W_V$ of the vertical stabilization gyroscope is developed by applying the output voltage $E_V$ of the vertical memory potentiometer 128 through conductor 154 to the input of isolation amplifier 156. A potentiometer 158 excited with a reference voltage is adjusted to develop an output voltage corresponding to the vertical gyroscope compensation rates $(R_V-U_{s-V})$. In order to multiply the long term angular rates $W_V$ and $W_N$ by the cosine of latitude and sine of latitude, respectively, the corresponding output voltages from the isolation amplifiers 156 and 150 are applied through respective resolver drive amplifiers 160 and 162 to the quadrature related cosine and sine function stator windings of a resolver 164. The rotor winding of the resolver is connected through conductor 166 to the input of a servo amplifier 168 of a servomechanism which controls the rotor displacement of resolver 164. The amplifier energizes a servo motor 170 in accordance with the resolver output signal and a rate feedback signal developed by a tachometer generator 172. The motor is coupled to the rotor of resolver 164 through a gear train 174 and, accordingly, the resolver rotor is displaced by the motor until the resolver output signal is reduced to null in which condition the resolver shaft angular position represents a computed value of latitude. Equation 25 shows that the ratio of the long term angular rates equals the tangent of latitude and, of course, the tangent of latitude is equal to the ratio of the sine and cosine functions of latitude. Since the long term angular rate $W_V$ is applied to the cosine winding of the resolver 164 and the long term angular rate $W_N$ is applied to the sine winding of the resolver 164, the voltage induced in the rotor of the resolver will be the sum of $W_N \cos \theta$ and $W_V \sin \theta$, where $\theta$ is the angular position of the rotor. As noted above with reference to Equation 25, these two quantities will be equal when $\theta$ is equal to the latitude $La$. Accordingly, the servo amplifier 168 and motor 170 will remain energized until the null condition is reached and then the shaft position will correspond to latitude.

With the computed latitude value available, the north angular velocity may be obtained. This is accomplished by taking the first time derivative of latitude by a suitable differentiating device such as the tachometer generator 172 which is driven by the servo motor 170. The output voltage of tachometer generator 172, corresponding to the computed north angular velocity $$\left(\frac{V_N}{R_S}\right)_C$$

is supplied to the east erection loop through conductor 220 and the north velocity computer. This computer comprises a servo amplifier 206 which energizes a servo motor 208 in accordance with the difference between the computed north velocity $$\left(\frac{V_N}{R_S}\right)_C$$

and the true north velocity $$\left(\frac{V_N}{R_S}\right)_T$$

(derived from the isolation amplifier 140 through conductor 210) and a rate feedback voltage from a tachometer generator 212. Thus, the shaft of servo motor 208 is positioned in accordance with the north angular velocity error and through a gear train 214 drives the movable contact of a potentiometer 216 which is excited with the reference voltage. The output voltage of the potentiometer 216 is applied to an isolation amplifier 218 wherein it is algebraically combined with the computed north angular velocity $$\left(\frac{V_N}{R_S}\right)_C$$

through conductor 220, the measured north angular velocity from the pit log 146 through conductor 221 and the true north angular velocity from the isolation amplifier 140 through conductors 210 and 222. Thus, the isolation amplifier 218 develops an output voltage corresponding to true north angular velocity which is applied through conductor 138 to the input of the isolation amplifier 98. The isolation amplifier 98 develops an output voltage which is applied to the torque amplifier 110 through the conductor 224 and which is applied through the feedback conductor 99 to the servo amplifier 88 which causes the output voltage of the potentiometer 94 to correspond to the true north angular vehicle velocity. The potentiometer voltage is applied through amplifier 140 to the torque amplifier 110 and is effective through the stabilization loop to disturb the pendulum 54. This disturbance is applied to the filter and integrator to change the voltage of the memory potentiometer 106 and thence through conductor 112 to the vertical erection loop. Thus isolation amplifier 114 develops an error voltage which is applied to the torque amplifier 130 through conductor 129 and also through the integrator and potentiometer 128. The resulting change of input to the torque amplifier develops a disturbance torque on the vertical gyro which changes the orientation of the east gyro. The north pendulum is disturbed and changes the output voltage of the memory potentiometer 106 and this change is inserted into the vertical erection loop. When the system has settled out, the azimuth error B has been reduced to zero and Equation 18 for the long term angular rate sensed by the north gyroscope now becomes $$W_N = W_e \cos La - \frac{\Delta V_E}{R_S} \qquad (27)$$

With latitude known, Equation 27 may be used to solve for the error in the east angular velocity by rearranging to obtain:

$$\frac{\Delta V_E}{R_S} = -(W_N - W_e \cos La) \qquad (28)$$

To obtain this error in east velocity, a resolver drive amplifier 176, supplied with a reference input voltage, is adjusted to develop a constant output voltage corresponding to earth rate $W_e$ which is applied to a winding of a resolver 178 having its rotor connected with the rotor of resolver 164 and thereby displaced angularly in accordance with computed latitude. The output voltage on the rotor winding of the resolver 178 therefore corresponds to the product of earth rate and the cosine of computed latitude and is applied through conductor 180 to a servo amplifier 182 in the east velocity computer. A voltage corresponding to $W_N$ is derived from the output of the isolation amplifier 150 and applied through a conductor 184 to the input of the servo amplifier 182. The servo amplifier 182 energizes the servo motor 186 in accordance with the summation of these input signals and a rate feedback signal developed by a tachometer generator 188. Accordingly, the servo motor 186 through a gear train 190 displaces the movable contact of a potentiometer 192 which is excited with the reference voltage. The output voltage of the potentiometer 192, as shown by inspection of Equation 28, corresponds to the error $$\frac{\Delta V_E}{R_S}$$

in the east angular velocity when the azimuth error B is reduced to zero. This velocity error voltage is applied to the input of an isolation amplifier 194 in which it is combined with the east velocity voltage from pit log 146 applied through conductor 196, the component of earth rate seen by the north stabilization gyroscope, $$\frac{W_e}{R_s} \cos La$$

applied through conductor 198, and the long term angular rate $W_N$ applied through conductor 184, the summation of which corresponds to the east angular velocity of the vehicle when the angular velocity error voltage from potentiometer 192 is the correct value. To obtain this relation, which is dependent upon a correct value of long term angular rate $W_N$, the output of the isolation amplifier 194 is applied across the primary winding of a transformer 200 and the primary winding is connected through conductor 132 to the input of the isolation amplifier 70. Thus, the isolation amplifier 70 develops an output voltage which is applied to the torque amplifier 82 through the conductor 202 and which is applied through the feedback conductor 71 to the servo amplifier 60 which causes the output voltage of the electromechanical filter on the potentiometer 66 to correspond to the computed east angular vehicle velocity. The potentiometer voltage is applied through amplifier 134 to the torque amplifier 82 and is effective through the stabilization loop to disturb the pendulum 56. This disturbance is applied to the filter and integrator to change the voltage of memory potentiometer 78. When the system has settled out, the component of voltage due to vehicle velocity has been removed from the memory potentiometer 78 and its output voltage corresponds to the long term angular rate $W_N$ sensed by the north gyrosope.

The long term angular rate sensed by the vertical gyroscope as expressed by Equation 20 with B decreasing to zero, now becomes:

$$W_V = W_e \sin La + \frac{\Delta V_E}{R_s} \tan La_i \qquad (29)$$

Therefore, the vertical erection loop memory potentiometer 128 may be corrected for the original angular velocity error by inserting a corrected heading compensation signal $$\frac{V_E}{R_s} \tan La$$

into the vertical erection loop. For this purpose, the computed east angular vehicle velocity $$\left(\frac{V_E}{R_s}\right)_c$$

developed by the transformer 200 is applied through conductors 201 to a tangent potentiometer 204 which has its movable contact displaced in accordance with the computed latitude by the servo motor 170. The output of the potentiometer 204 is applied through conductor 144 to the torque amplifier 130 in the vertical erection loop. The output of the torque amplifier thus changes in accordance with the heading compensation or computed small circle correction $$\left(\frac{V_E}{R_s}\right)_c \tan La$$

and is applied to the torque microsyn 53 on the output shaft of the vertical gyro 26. Accordingly, the signal microsyn develops a corresponding output voltage which is applied through the servo amplifier 54 through the yaw torque motor 56. Thus the voltage on the vertical erection loop memory potentiometer 128 is corrected.

A longitude computer is provided to develop present longitude information from the previously developed east angular velocity information. In the illustrative system, present longitude L is determined by obtaining initial longitude $L_1$ from a position fix and adding the integrated east angular vehicle velocity which corresponds to the change of longitude $dL$. This relation is expressed as follows:

$$L = L_1 + dL \qquad (30)$$

$$dL = \int_0^t \frac{V_E dt}{R_s \cos La} \qquad (31)$$

The longitude computer comprises an isolation amplifier 232 to which is applied the true east angular vehicle velocity through the conductor 234 and a feedback voltage developed from the output of the isolation amplifier which is applied through a resolver drive amplifier 236 to the cosine winding of a resolver 238 which has its rotor displaced in accordance with latitude by the latitude computer servo motor 170. Accordingly, the output of the isolation amplifier 232 corresponds to the rate of change of longitude and is applied to an integrator comprising a servo amplifier 240 which energizes a servo motor 242 in accordance with the output of the isolation amplifier 232 and a rate feedback from a tachometer generator 244. Thus the angular displacement of the servo motor 242 corresponds to the change in longitude and this angular displacement is transmitted through a gear train 246 to one input of a mechanical differential 248. The initial longitude information obtained by a position fix is supplied through a manually positioned actuator 250 through a gear train 252 to the other input of the mechanical differential 248. Accordingly, the angular position of the output of the differential 248 corresponds to the sum of the initial longitude and the change of longitude and the differential displaces the movable contact of a potentiometer 254 which is excited with a reference voltage. The output voltage of the potentiometer 254 then corresponds to the present longitude which may be applied to the desired utilization device such as the prelaunch data computer for target parameter calculation.

The operation of the system may be summarized as follows. Consider the inertial guidance system in an aircraft adapted for launching from a seagoing carrier vehicle. When the stable platform is erected to the local vertical, north, and east orientation, inaccurate velocity information from the pit log will introduce an azimuth error during gyrocompassing to east. The stabilization gyroscopes will sense components of earth rate and the velocity of the carrier vehicle with respect to the earth. Accordingly, the north erection loop memory potentiometer 78 and the vertical erection loop memory potentiometer 128 will memorize voltages including components of long term angular rates arising from both earth rate and carrier vehicle velocity. The ratio of these long term angular rates is developed in the latitude computer and represents the tangent of latitude. This latitude information is independent of original velocity error and is represented by a shaft position which may be presented on an indicator 256. North angular velocity is computed by taking the first time derivative of latitude and the computed north angular velocity is subtracted from the measured velocity and inserted in the east erection loop to correct the east gyro memory potentiometer 106. True north angular velocity is developed in the form of a voltage and may be presented on an indicator 260. From the latitude information and the long term angular rate sensed by the north gyroscope, the error in measured east angular velocity is determined and fed to the north erection loop to correct the north gyro memory potentiometer 78. True east angular velocity is developed in the form of a voltage and presented on an indicator 258. The error in the east angular velocity when multiplied by the tangent of latitude is used to correct the vertical gyro memory potentiometer 128. The system is thus accurately aligned with the correct launch memories and accurate velocity information is available for the initial conditions on the accelerometers. The longitude computer integrates east angular velocity and adds the longitude change to an initial longitude fix to obtain present longitude. The longitude is developed as a shaft position and may be presented on an indicator 262. The position information in the form of latitude and longitude is thus available for the prelaunch data computer of the aircraft to permit inertial navigation from the launch point to the target.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. A latitude computer comprising a stable platform adapted for rotation about three mutually orthogonal axes, a north gyroscope, an east gyroscope, and a vertical gyroscope mounted on the platform with their input axes mutually orthogonal, each of said gyroscopes including a signal generator and a torque motor connected with its output shaft, a stabilization servo system connected between the signal generators and the platform, a north erection loop including an east pendulum mounted on the platform, a north gyroscope memory device connected between the east pendulum and the torque motor on the north gyroscope, an east erection loop including a north pendulum mounted on the platform, an east gyroscope memory device connected between the north pendulum and the torque motor on the east gyroscope whereby the platform is erected to the local vertical direction, a vertical erection loop including a vertical gyroscope memory device connected between the east gyroscope memory device and the torque motor on the vertical gyroscope whereby the platform is oriented with the input axis of the east gyroscope pointed east and signal quantities corresponding to the earth rate sensed by the gyroscopes are developed by the respective memory devices, and computer means connected with the north gyroscope memory device and the vertical gyroscope memory device for developing a latitude signal quantity corresponding to the arctangent of the ratio of the signal quantities developed thereby.

2. The combination defined by claim 1 including differentiating means connected with the computer means for developing a signal quantity corresponding to the time rate of change of the latitude signal quantity to obtain a measure of northward velocity.

3. A latitude computer comprising a stable platform adapted for rotation about three mutually orthogonal axes, a north gyroscope, an east gyroscope, and a vertical gyroscope mounted on the platform with their input axes mutually orthogonal, each of said gyroscopes including a signal generator and a torque motor connected with its output shaft, a stabilization servo system connected between the signal generators and the platform to maintain the platform oriented in accordance with the input angular rates sensed by the gyroscopes, a north erection loop including an east pendulum mounted on the platform and developing a signal voltage corresponding to the inclination of the platform in the plane of the east gyroscope input axis, a low pass filter and an integrator including a north gyroscope memory potentiometer connected between the east pendulum and the torque motor on the north gyroscope whereby the north gyroscope is precessed until the platform is level in one plane and the memory potentiometer develops a first signal votlage corresponding to the component of earth rate sensed by the north gyroscope, an east erection loop including a north pendulum mounted on the platform and developing a signal voltage corresponding to the inclination of the platform in the plane of the north gyroscope input axis, a low pass filter and an integrator including an east gyroscope memory potentiometer connected between the north pendulum and the torque motor on the east gyroscope whereby the east gyroscope is precessed until the platform is level in the other plane and the east gyroscope memory potentiometer develops a second voltage corresponding to the component of earth rate sensed by the east gyroscope, a vertical erection loop with an integrator connected with the east gyroscope memory potentiometer and including a vertical gyroscope memory potentiometer connected to the torque motor on the vertical gyroscope whereby it is precessed until the platform is aligned with the east gyroscope input axis pointed east and vertical gyroscope memory potentiometer develops a third signal voltage corresponding to the component of earth rate sensed by the vertical gyroscope, and computer means connected with the north and vertical gyroscope memory potentiometers for developing a latitude signal quantity corresponding to the arctangent of the ratio of the third and first signal quantities as an indication of latitude.

4. A latitude computer comprising a support structure adapted for mounting on a vehicle, a stable platform supported by said structure for rotational displacement about three mutually orthogonal axes, a north gyroscope, an east gyroscope and a vertical gyroscope mounted upon said platform with input axes mutually orthogonal, each of said gyroscopes including a signal generator and a torque motor connected with its output shaft, a stabilization servo system connected between the signal generators and the platform to maintain it in a stable orientation, a north gyroscope erection loop including a vertical sensing device mounted on the platform with its input axis aligned with the input axis of the east gyroscope and developing a signal voltage corresponding to the inclination of said platform, a low pass filter and an integrator including a north gyroscope memory potentiometer connected between said sensing device and the torque motor of the north gyroscope to precess it until the stable platform is level in one vertical plane and the memory potentiometer develops an earth rate signal voltage for the north gyroscope corresponding to the earth rate component sensed thereby, an east erection loop including a vertical sensing device mounted on the platform and having its input axis aligned with the input axis of the north gyroscope and developing an output voltage corresponding to the inclination of said platform in another vertical plane, said east stabilization loop including a low pass filter and an integrator including an east gyroscope memory potentiometer connected between the last mentioned vertical sensing device and the torque motor of the east gyroscope whereby it is precessed until said platform is level in the other vertical plane and the east gyroscope memory potentiometer develops an earth rate signal voltage corresponding to the earth rate sensed thereby, a vertical erection loop integrator including a vertical gyroscope memory potentiometer connected between east gyroscope memory potentiometer and the torque motor of the vertical gyroscope whereby it is processed until the input axis of the each gyroscope is pointed in the east direction and the vertical gyroscope memory potentiometer develops an earth rate signal voltage corresponding to the component of earth rate sensed thereby, a resolver having a stator with a pair of space-quadrature input windings and a rotor having an output winding, one input winding connected with the north gyroscope memory potentiometer and the other input winding connected with the vertical gyroscope memory potentiometer, a servo motor mechanically coupled with the rotor of said resolver and a servo amplifier having its input coupled with the rotor winding of said resolver and its output coupled with said servo motor whereby said resolver rotor is angularly displaced in accordance with the arctangent of the ratio of the vertical gyroscope earth rate signal voltage and the north gyroscope earth rate signal voltage as an indication of latitude.

5. A latitude computer adapted for use on moving vehicles and comprising a stable platform adapted for rotation about three mutually orthogonal axes, a north gyroscope, an east gyroscope, and a vertical gyroscope mounted on the platform with their input axes mutually orthogonal, each of said gyroscopes including a signal generator and a torque motor connected with its output shaft, a stabilization servo system connected between the signal generators and the platform, a north erection loop including an east pendulum mounted on the platform, a north gyroscope memory device connected between the east pendulum and the torque motor on the north gyroscope, an east erection loop including a north pendulum mounted on the platform, an east gyroscope memory device connected between the north pendulum and the torque motor on the east gyroscope whereby the platform is erected to the local vertical direction, and first and second signal quantities corresponding to components of earth rate and vehicle velocity relative to the earth sensed by the gyroscopes are developed by the respective memory devices, vehicle velocity determining means developing third and fourth signal quantities corresponding to vehicle north angular velocity and east angular velocity respectively, means connecting the velocity determining means with the memory devices for subtracting the third signal quantity from the first signal quantity and the fourth signal quantity from the second signal quantity to develop a north gyroscope earth rate signal quantity and a vertical gyroscope earth rate signal quantity respectively, and a computer connected with the last named means for developing a latitude signal corresponding to the arctangent of the ratio of the north and vertical earth rate signal quantities.

6. A latitude computer for use on a moving vehicle and comprising a first gyroscopic means having its input axis aligned with the north direction and developing a first signal quantity corresponding to the angular rate about its input axis, a second gyroscopic means having its input axis aligned with the vertical direction and developing a second signal quantity corresponding to the angular rate about its input axis, vehicle velocity measuring means developing a signal quantity corresponding to east angular velocity of the vehicle relative to the earth, first combining means connected with the first gyroscopic means and the velocity measuring means and developing a first signal quantity corresponding to the component of earth rate sensed by the first gyroscopic means, second combining means connected with the second gyroscopic means and developing a second signal quantity, an arctangent computer connected with the first and second combining means and developing an output signal quantity corresponding to the tangent of the ratio of the first and second signal quantities, multiplying means connected with said computer and the velocity measuring means and developing a compensation quantity corresponding to the product of the east angular velocity and the tangent of said output signal quantity, said multiplying means being connected with said second combining means to cause the second signal quantity to correspond to the component of earth rate sensed by the second gyroscopic means whereby said output signal quantity corresponds to latitude.

7. A latitude computer for use on moving vehicles and comprising a first gyroscope having its input axis aligned with the north direction and including a signal generator developing a first signal voltage corresponding to the angular rate about its input axis, a second gyroscope having its input axis aligned with tne vertical direction and including a signal generator developing a second signal voltage corresponding to the angular rate about its input axis, vehicle velocity measuring means developing a signal voltage corresponding to east angular velocity of the vehicle relative to the earth, first combining means connected with the first mentioned signal generator and the velocity measuring means and developing a first signal voltage corresponding to the component of earth rate sensed by the first gyroscope, second combining means connected with the second mentioned signal generator and developing a second signal voltage, resolving means having one input connected with the output of the first combining means and the other input connected with the output of the second combining means and developing an output signal quantity corresponding to the arctangent of the ratio of the first and second signal voltages, multiplying means connected with said resolver and the velocity measuring means and developing a compensation voltage corresponding to the product of the east angular velocity and the tangent of said output signal quantity of the resolver, said multiplying means being connected with said second combining means to cause the second signal voltage to correspond to the component of earth rate sensed by the second gyroscope whereby said output signal quantity corresponds to the latitude.

8. A latitude computer for use on a moving vehicle and comprising a stable platform adapted to be supported on a vehicle for rotational displacement about three mutually orthogonal axes, a north gyroscope, east gyroscope, and a vertical gyroscope mounted on said platform with their input axes mutally orthogonal, each of said gyroscopes including a signal generator and a torque motor connected with the gyroscope output shaft, a stabilization servo system connected between the signal generators and the platform, a north gyroscope erection loop including a north gyroscope memory potentiometer connected to the torque motor of the north gyroscope and developing a first signal voltage corresponding to the long term angular rate about the north gyroscope input axis, an east gyroscope erection loop including an east gyroscope memory potentiometer connected with the torque motor of the east gyroscope and developing a second signal voltage corresponding to the long term angular rate about the east gyroscope input axis, a vertical erection loop including a vertical gyroscope memory potentiometer connected between the east gyroscope memory potentiometer and the torque motor of the vertical gyroscope and developing a third signal voltage corresponding to the long term angular rate about the vertical gyroscope input axis, vehicle velocity measuring means developing an east angular velocity signal voltage and a north angular velocity signal voltage, said measuring means being connected to the north erection loop to cause the first signal voltage to correspond to the component of earth rate sensed by the north gyroscope, said measuring means being connected with the east erection loop to cause the second signal voltage to correspond to the component of earth rate sensed by the east gyroscope, an arctangent computer connected with the north gyroscope memory potentiometer and the vertical gyroscope memory potentiometer and developing a latitude signal quantity corresponding to the tangent of the ratio of the first and third signal voltages, multiplying means connected with the computer and the velocity measuring means and developing a compensation voltage corresponding to the product of the east angular velocity and the tangent of the latitude signal quantity, said multiplying means being connected with said vertical erection loop to cause the third signal voltage to correspond to the component of earth rate sensed by the vertical gyroscope whereby the latitude signal quantity corresponds to latitude.

9. A latitude computer for use on a moving vehicle and comprising a stable platform adapted to be supported on a vehicle for rotational displacement about three mutually orthogonal axes, a north gyroscope, east gyroscope, and a vertical gyroscope mounted on said platform with their input axes mutually orthogonal, each gyroscope including a signal generator and a torque motor connected with the gyroscope output shaft, a stabilization servo system connected between the signal generators and the platform, a north gyroscope erection loop including a north gyroscope memory potentiometer connected to the torque motor of the north gyroscope and developing a first signal voltage corresponding to the long term angular rate about the north gyroscope input axis, an east gyroscope erection loop including an east gyroscope memory potentiometer connected with the torque motor of the east gyroscope and developing a second signal voltage corresponding to the long term angular rate about the east gyroscope input axis, a vertical erection loop including a vertical gyroscope memory potentiometer connected between the east gyroscope memory potentiometer and the torque motor of the vertical gyroscope and developing a third signal voltage corresponding to the long term angular rate about the vertical gyroscope input axis, a north velocity computer and an east velocity computer including vehicle velocity measuring means developing a measured east angular velocity signal voltage and a measured north angular velocity signal voltage, said north velocity computer developing a true north velocity signal voltage and being connected to the north erection loop to cause the second signal voltage to correspond to the component of earth rate sensed by the east gyroscope, said east velocity computer developing a true east velocity signal voltage and being connected with the north erection loop to cause the first signal voltage to correspond to the component of earth rate sensed by the north gyroscope, an arctangent computer connected with the north gyroscope memory potentiometer and the vertical gyroscope memory potentiometer and developing a latitude signal quantity corresponding to the arctangent of the ratio of the first and third signal voltages, multiplying means connected with the arctangent computer and the velocity measuring means and developing a compensation voltage corresponding to the product of the east angular velocity and the tangent of the latitude signal quantity, said multiplying means being connected wtih said vertical erection loop to cause the third signal voltage to correspond to the component of earth rate sensed by the vertical gyroscope, differentiating means connected with the arctangent computer for developing a computed north angular velocity signal corresponding to the time rate of change of the latitude signal quantity, said north velocity computer being connected with said differentiating means and measuring means to combine the computed north velocity signal voltage and measured north velocity signal voltage to develop said true north velocity signal voltage, resolving means connected with the arctangent computer for developing a signal voltage corresponding to the product of earth rate and the cosine of computed latitude, said east velocity computer being connected with the resolving means, the north gyroscope memory potentiometer, and the measuring means to combine the last mentioned signal voltage, said first signal voltage and measured north velocity signal voltage to develop said true east velocity signal voltage.

References Cited by the Examiner

UNITED STATES PATENTS

| 2,688,442 | 9/54 | Droz et al. | 235—192 |
| 2,762,123 | 9/56 | Schultz et al. | |
| 2,771,779 | 11/56 | Schaffer et al. | 74—5.34 |
| 2,953,858 | 9/60 | Wrigley et al. | |

FOREIGN PATENTS

| 331,956 | 7/30 | Great Britain. |

MALCOLM A. MORRISON, *Primary Examiner.*

CHESTER L. JUSTUS, MAYNARD R. WILBUR,
*Examiners.*

UNITED STATES PATENT OFFICE
CERTIFICATE OF CORRECTION

Patent No. 3,198,940                                  August 3, 1965

Edward J. Loper et al.

It is hereby certified that error appears in the above numbered patent requiring correction and that the said Letters Patent should read as corrected below.

Column 2, line 55, after "specified" insert -- otherwise --; column 3, line 31, for "accelations" read -- accelerations --; column 6, line 49, for "actuatol" read -- actual --; line 65, for "troque" read -- torque --; column 7, line 29, for "$w_E=-w_N$" read -- $w_E=-w_W$ --; column 9, line 26, for "circue" read -- circle --; column 16, line 51, for "processed" read -- precessed --; line 52, for "each" read -- east --; column 17, line 59, for "tne" read -- the --.

Signed and sealed this 15th day of March 1966.

(SEAL)
Attest:

ERNEST W. SWIDER                                EDWARD J. BRENNER
Attesting Officer                                   Commissioner of Patents